United States Patent

Nunez et al.

[11] Patent Number: 5,565,539
[45] Date of Patent: Oct. 15, 1996

[54] CONTACT LENSES WITH HYDROPHILIC CROSSLINKERS

[75] Inventors: Ivan Nunez, Jacksonville; Frank F. Molock, Orange Park; Laura Elliott, Jacksonville, all of Fla.

[73] Assignee: Johnson & Johnson Vision Products, Inc., Jacksonville, Fla.

[21] Appl. No.: 484,133

[22] Filed: Jun. 7, 1995

[51] Int. Cl.$^6$ .................................................. C08F 20/10
[52] U.S. Cl. .................................................. 526/318
[58] Field of Search .................................................. 526/318

[56] References Cited

U.S. PATENT DOCUMENTS 3,980,483  9/1976  Nishikubo et al. .
4,072,592  2/1978  Due et al. .
4,146,452  3/1979  Weber et al. .
4,284,710  8/1981  Burg .
5,457,140  10/1995  Nunez et al. .

OTHER PUBLICATIONS

JP50087138, 750514, Kobayashi et al. "Crosslinking resin Compositions" 1975:594338–abstract p. 63.

*Primary Examiner*—Joseph L. Schofer
*Assistant Examiner*—N. Sarofim

[57] ABSTRACT

Hydrophilic contact lenses made using a crosslinking agent of the formula $$A-X-(O-(C(O)-R-(C(O))_r-O-X)_n-A$$

wherein R contains one or more cyclic or bicyclic moiety, X is linear or branched alkyl or alkenyl, optionally substituted, and A is acrylate, methacrylate, vinylbenzoyloxy or vinylphenoxy, exhibit superior hydrophilicity, oxygen transmissivity, and physical properties.

24 Claims, No Drawings

CONTACT LENSES WITH HYDROPHILIC CROSSLINKERS

FIELD OF THE INVENTION

The present invention relates to contact lenses made from hydrophilic polymeric material. Such contact lenses, also known often as "soft" contact lenses, are notably comfortable and permit diffusion of water and oxygen therethrough to the cornea.

Hydrophilic polymers used to produce contact lenses are typically homopolymers or copolymers of one or more often more than one monomer. In order to attain structural integrity and strength, the polymer is crosslinked with a small but effective amount of one or more crosslinking agents. Such agents are typically reactive at two different sites, and thereby covalently bond into two different polymer chains and form a stable three-dimensional network.

Crosslinking agents conventionally used in the production of hydrophilic contact lenses, such as ethylene glycol dimethacrylate and diglycidyl bisphenol A dimethacrylate, have been known to exhibit an undesirable tendency to reduce the water content of the lens with increasing content of the crosslinking agent in the lens polymer. This characteristic causes the operator to choose between higher water content (and associated comfort and enhancement of corneal health) and lens strength.

There accordingly remains a need in this field for new polymers for use in producing contact lenses, which provide higher levels of both water content and structural integrity.

DESCRIPTION OF PRIOR ART

U.S. Pat. No. 3,980,483 to Nishikubo et al. discloses photocurable compositions useful in making relief images on a substrate, wherein the compositions contain the reaction product of the addition compound obtained from an epoxy resin and a photopolymerizable $\alpha,\beta$-unsaturated carboxylic acid, and a dibasic acid anhydride; a photopolymerizable monomer; and an initiator. Similar disclosures are found in U.S. Pat. No. 4,146,452 to Weber et al., U.S. Pat. No. 4,072,592 to Due et al., and U.S. Pat. No. 4,284,710 to Burg et al. These disclosures do not at all address the production of contact lenses, nor the problems associated with obtaining a desirable balance of properties in a hydrophilic contact lens.

BRIEF SUMMARY OF THE INVENTION

The present invention satisfies the needs described hereinabove and provides the additional advantages disclosed herein. One aspect of the invention is a hydrophilic contact lens formed by copolymerizing a polymerizable mixture comprising at least one hydrophilic monomer and further comprising at least one crosslinking agent of the general formula (1)

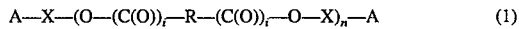

$$A\text{---}X\text{---}(O\text{---}(C(O))_i\text{---}R\text{---}(C(O))_i\text{---}O\text{---}X)_n\text{---}A \quad (1)$$

wherein n is 1 to 6; each i is independently 0 or 1;

R is a divalent bridge containing at least one saturated or unsaturated cyclic or bicyclic moiety;

X is a linear divalent alkyl bridge containing 2 to 12 carbon atoms optionally substituted with at least one side chain which contains a —OC(O)— linkage and a total of up to 12 carbon atoms, which is optionally substituted with fluorine, and which optionally contains a phenyl ring that can optionally be substituted with alkyl containing 1 to 6 carbon atoms; and A is acrylate, methacrylate, vinylbenzoyloxy, or vinylphenoxy, and is optionally endcapped with a polyalkoxy group containing up to 10 ethoxy or propoxy units;

provided that one or both of R and X is substituted with at least one —COOH group.

Another aspect of the present invention is the method of producing a contact lens which comprises forming a polymerizable mixture which upon polymerization forms a hydrophilic polymer, the mixture containing at least one crosslinking agent of formula (1) defined herein, and polymerizing the mixture in the shape of a contact lens.

DETAILED DESCRIPTION OF THE INVENTION

The contact lenses of the present invention can be made by copolymerizing a mixture containing one or more monomers including at least one monomer ("hydrophilic monomer") which imparts hydrophilicity to the polymerized lens, and also including at least one crosslinking agent which imparts structural integrity to the lens, and also preferably including a polymerization initiator. A lens is considered "hydrophilic" if it is capable from its dry state of absorbing water (or an aqueous saline solution) and of holding the absorbed water in equilibrium.

Suitable hydrophilic monomers are preferably esters of carboxylic acids that contain ethylenic unsaturation, such as acrylic, methacrylic, fumaric and maleic acids. Preferred esters include monohydroxy-substituted and dihydroxy-substituted alkyl, alkoxyalkyl, and poly(alkoxy) esters of such acids. More preferred are esters of acrylic and methacrylic acid with alkyl groups (preferably containing 1 to 6 carbon atoms) wherein the alkyl group is substituted with 1, 2 or more hydroxyl groups. Examples of such hydroxy esters include 2-hydroxyethyl methacrylate ("HEMA"), 2-hydroxyethyl acrylate ("HEA"), 2,3-dihydroxypropyl methacrylate and acrylate, and monohydroxypropyl acrylate and methacrylate.

Other useful monomers (comonomers) include ethylenically unsaturated carboxylic acids per se, such as acrylic acid, methacrylic acid, fumaric acid and maleic acid; heterocyclic N-vinyl lactams such as N-vinyl pyrrolidone; noncyclic amides such as N-(1,1-dimethyl-3-oxobutyl)-acrylamide; aminoalkyl esters of ethylenically unsaturated acids, such as 2-aminoethyl methacrylate and the like; mercaptoalkyl esters of ethylenically unsaturated acids; perfluoroalkyl methacrylates and acrylates, especially those containing 1 to 6 carbon atoms; methacrylic anhydride; and acrylic anhydride.

The foregoing monomers generally comprise 60–98 wt. % of the polymerizable components of the polymerizable mixture, and preferably about 65–95 wt. % thereof.

The crosslinking agent(s) will comprise a difunctional or polyfunctional comonomer having 2 or more sites that react with the other monomeric species present. Typically these sites contain polymerizable ethylenic unsaturation. Examples of conventional compounds of this type useful in producing contact lenses include ethylene glycol dimethacrylate and trimethylolpropane trimethacrylate. Other useful crosslinking agents include polyethylene glycol of molecular weight 100 to about 8,000, di-endcapped with acrylate or methacrylate; diglycidyl bisphenol A diol di-endcapped with acrylate or methacrylate; and bisphenol A di-endcapped with acrylate or methacrylate.

An essential aspect of the present invention is the incorporation in the polymerizable mixture of at least one crosslinking agent of the formula (1)

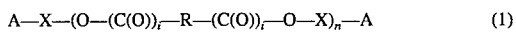

A—X—(O—(C(O))$_i$—R—(C(O))$_i$—O—X)$_n$—A     (1)

In formula (1), the subscript n is 1 to 6, meaning that the crosslinking agent can be based on an oligomeric epoxy resin containing repeating R and X units (as defined herein) and endcapped with units A as defined herein. Preferably, n is 1 or 2 and more preferably n is 1.

The subscript i is independently in each occurrence 0 or 1, meaning that each R is linked into the molecule through ester or oxy linkages. For ease of synthesis as will be described more fully herein, it is preferred that when i is 1, the R component carries at least one and more preferably two —COOH substituents, and when i is 0, the A component carries at least 1 and more preferably two —COOH substituents.

The divalent component R in formula (1) contains one or more than one ring; when more than one ring is present they can be fused to each other, connected to each other by a chemical bond, or both connected to an intervening segment.

One preferred structure for R is —Ph—Z—Ph— wherein Ph denotes a phenyl ring, and Z is a divalent segment connecting the two Ph rings. Each Ph ring can be unsubstituted or, optionally, can be substituted with one or two alkyl groups containing 1 to 6 carbon atoms. Preferably, Z is a chemical bond, —O—, —SO$_2$—, or —C(Y)$_2$—, wherein Y is hydrogen or alkyl containing 1 to 6 carbon atoms which is optionally fluorinated. Preferred examples of Y are hydrogen, methyl, and trifluoromethyl.

Another preferred structure for R is a phenyl ring —Ph— which can optionally be unsubstituted or substituted as set forth above. R can also be any fused two-ring homocyclic moiety, such as naphthyl, dihydronaphthyl, tetrahydro-hydronaphthyl, indanyl, indenyl, or bicyclics such as bicyclo [2.2.2] oct-7-ene (which, if drawn, would comprise a cyclohexane ring having an ethylenic bridge —CH═CH— connecting the two carbons of the cyclohexane situated para to each other). In addition, R can take the form of a moiety —Z— between two of the foregoing fused two-ring homocyclic moieties. The fused two-ring moieties can be unsubstituted or, as with the Ph, can optionally be substituted with alkyl containing 1 to 6 carbon atoms which is optionally fluorinated.

As will be stated at several points herein, the component R is also optionally substituted with one, two or more —COOH groups.

Referring again to formula (1), the component X comprises a divalent linear alkyl group which contains 2 to 12 carbon atoms. X optionally is substituted with at least one side chain alkyl or alkenyl segment which contains a —OC(O)— linkage. The optional side chain segment contains a total of up to 12 carbon atoms and can optionally be substituted with fluorine at some or all substitutional sites. The optional side chain segment can include a phenyl ring, which itself can optionally be substituted with alkyl containing 1 to 6 carbon atoms. Such side chains can be branched, and alkenyl side chains can contain a carbon-carbon double bond in the side chain and in a branch therefrom, for instance as ═CH$_2$.

In preferred embodiments, X includes 2 to 6 and more preferably 2 to 3 carbon atoms in the main chain of the molecule depicted in formula (1), with the remaining portion of X, if any, as a side chain. Examples of preferred side chains include —OC(O)— to which is attached —CH$_2$CH$_2$—, —CH(CH$_3$)CH$_2$—, —CH═CH—, —CF$_2$CF$_2$—, —CF$_2$CF$_2$CF$_2$, —CH$_2$CH$_2$CH$_2$, —CH(═CH$_2$)CH$_2$—, and —C$_6$H$_4$—, capped with —H and optionally substituted with one, two or more —COOH groups. Preferably, when X is substituted with —COOH, the —COOH is attached at the end of a side chain pendant from the portion of X that lies in the main chain between R and A.

The component A in formula (1) is preferably an acrylate or methacrylate endcapping unit but can also be vinylbenzoyloxy (i.e., derived from vinyl benzoic acid such as 4-vinyl benzoic acid) or vinyl phenoxy (i.e., derived from vinylphenol). Optionally, a polyethoxy or polypropoxy segment containing up to 20 ethoxy or propoxy units, is present between a and the X segment.

Compounds of formula (1) can be synthesized by several different pathways. As will be seen, the choice of pathway is determined somewhat by the desired point of attachment of the 1 or more —COOH groups. In one pathway, a precursor of the compound of formula (1) is formed wherein in at least two occurrences a component X' appears instead of X, wherein X' contains at least one pendant hydroxyl group. This can be achieved by reacting a diol or diacid of R, of the formula HO—R—OH or HOOC—R—COOH, as the case may be, to form the corresponding dihydroxyalkyl-endcapped intermediate which is then diesterified with acrylic acid, methacrylic acid, or a polyethoxylated derivative thereof.

Next, the remaining pendant hydroxy groups are reacted with a cyclic acid anhydride such that the anhydride opens, esterifies the pendant hydroxy groups, and creates the desired branched structure of X which is connected to the main chain of the crosslinking agent through a —OC(O)— linkage and is terminated with a —COOH group. Suitable anhydrides include succinic, methyl succinic, maleic, itaconic, glutaric, perfluoroglutaric, perfluorosuccinic, and phthalic anhydrides. The reaction with the anhydride is carried out in any inert aprotic solvent, such as methylene chloride, acetonitrile, toluene, pyridine, isopropyl acetate, or tetrahydrofuran. The reaction is preferably carried out in the presence of a small but effective amount of a catalyst such as 4-dimethylamino pyridine and triethylamine. This first synthetic pathway is especially adaptable to reactions of bisphenol diols, thereby forming compounds of formula (1) wherein R is —Ph—Z—Ph— and the required one or more —COOH groups depend from the X component. Here, typically, there are two or more such —COOH substituents.

A second synthetic pathway begins with a dianhydride of the component R and reacts it with 2 molar equivalents of a hydroxy-terminated compound of the formula HO—X—A. This reaction is carried in a suitable aprotic solvent such as any of the foregoing solvents disclosed above as useful in the reaction with the anhydride in the first synthetic pathway. Among the useful dianhydrides in this reaction are 4, 4-(hexafluoroisopropylidene) di-phthalic anhydride, 4, 4'-oxydiphthalic anhydride, 4, 4'-biphthalic anhydride, 3, 3 ', 4, 4 '-diphenylsulfone tetracarboxylic dianhydride, bicyclo [2.2.2] oct-7-ene-2,3, 5, 6 - tetracarboxylic dianhydride, 1,2,4,5-benzene tetracarboxylic dianhydride, and 1,4,5,8-naphthalene tetracarboxylic dianhydride. This synthetic pathway is especially adaptable to producing compounds of formula (1) wherein one or more and more typically two or more —COOH groups required are pendant from the R component.

In either case, or following other synthetic routes to the same end which may be apparent, the desired compound of formula (1) is recovered and added to the monomer mixture described above. The amount of all crosslinking agents present should be about 5 to about 30 wt. % of all polymerizable components present. Preferably, the crosslinking agent of formula (1) comprises at least about 0.1 wt. % of all polymerizable components present, up to about 30 wt. % thereof, depending upon whether other crosslinking agents are present as well.

The reaction mixture also should include an initiator, usually in an amount from about 0.05 to about 5.0 percent by weight of the polymerizable components of the mixture. Any of numerous well-known initiators can be used, presenting a variety of initiation mechanisms. For instance, polymerization can be initiated thermally, or by exposure of the mixture to ultraviolet light, an electron beam, or other radiation. Examples of useful initiators include lauroyl peroxide, benzoyl peroxide, isopropyl percarbonate, azobisisobutyronitrile, redox systems such as the ammonium persulfate/sodium metabisulfite system, and benzoin and its ethers. The preferred initiation mechanism is ultraviolet radiation ("UV"), and the preferred UV initiator is alpha-hydroxy-alpha, alpha-dimethyl acetophenone ("Darocur 1173").

The polymerization reaction is carried out under conditions which are generally familiar in this field and which can be established in detail quite readily for any given set of reactants. The polymerization can be carried in the absence or presence of solvent or diluent. If the polymerization is carried out in the absence of a diluent, the resulting polymer can be formed, as for example by lathe cutting, into the desired lens shape. Alternatively, and more preferably, the polymerization is carried out in the presence of a suitable inert diluent, such as the diluents described in U.S. Pat. No. 4,680,336, the disclosure of which is hereby incorporated herein. The preferred inert diluent is a water displaceable boric acid ester, the formation and use of which are described in U.S. Pat. No. 4,495,313, the disclosure of which is hereby incorporated herein. Suitable boric acid esters include those prepared by heating boric acid and one or more polyhydroxyl compounds containing three or more hydroxy groups, such as glycerol trimethylolpropane, glucose, or mixtures of any of these with compounds having two hydroxy groups such as propylene glycol, diethylene glycol, butane diol, and/or sorbitol. The monomer mixture when combined with a solvent or diluent is placed into a mold whose interior shape is that of a contact lens.

The monomer-initiator mixture is treated to initiate polymerization, such as by exposure to ultraviolet radiation of sufficient intensity and duration. The polymerization is allowed to proceed to completion, which in the case of a contact lens usually requires several minutes. The lens is then removed from the mold, and hydrated in physiological saline to allow it to take its equilibrium shape and to wash out undesired byproducts, diluent, and the like.

Contact lenses produced in accordance with the present invention exhibit highly advantageous strength combined with a desirably high water content and oxygen transmissivity. These properties are apparent especially when the inventive lenses are compared to lenses made by conventional techniques or using other reactants. In particular, equilibrating the lens in water and especially in aqueous physiological saline solution (having a pH value of about 6 to about 8) converts the —COOH groups to their ionized form, such that the crosslinking agent does not detract from the hydrophilicity or water content of the lens and, indeed, the crosslinking agent contributes to the hydrophilicity and equilibrium water content of the lens.

The invention is described further in the following examples, which are provided for purposes of illustration and are not intended to limit the scope of the invention for which the applicants seek patent protection.

The test methods referred to in the examples are as follows:

Test Method 1: Tensile Properties (Modulus, Elongation and Tensile Strength)

The lens to be tested is cut to the desired specimen size and shape, and the cross-sectional area is measured. The sample is then attached into the upper grip of a constant rate of movement type of testing instrument equipped with a load cell. The crosshead is lowered to the initial gauge length and the sample specimen attached to the fixed grip. The sample is then elongated at a constant rate of strain and the resulting stress-strain curve is recorded. The elongation is expressed in percent of the initial specimen dimension, and the tensile modulus and strength at break in psi (pounds per square inch).

Test Method 2: Gravimetric Water Content

Samples for gravimetric water content measurement were prepared as follows: A number of 20 mm diameter×3.0 mm deep cylindrical polystyrene cavities were hand filled with the formulation at 60-degrees C., and cured for approximately 20 minutes under fluorescent ultraviolet tubes in a nitrogen atmosphere. The total measured energy dose was 1.2–1.6 Joules per square centimeter. The polymer/diluent discs were demolded from the polystyrene cavities using a hot-plate. The discs were then cut with a no. 7 cork bore to obtain a 9–10 mm diameter disc. Typically, the polystyrene cavities are filled with sufficient reactive monomer mix to obtain a 1.1–1.5 mm thick disc. The diluent-swollen polymer discs were hydrated in deionized water for 48 hours at 70° C. The hydrated discs were then removed from the deionized water bath, allowed to air dry for 10–15 hours, and subsequently vacuum dried (pressure<1.5 mm Hg) at 100° C. for 4 hours. The weight of each disc was taken, and the discs were then placed in physiological saline solution at room temperature for 2 days. The polymer discs were then removed from the saline solution, blotted carefully to remove surface water, and weighed again. The equilibrium water content (EWC) is then calculated as follows:

$$EWC(\%) = 100 \times (m(wet) - m(dry))/m(wet)$$

where m(dry) and m(wet) denote the weight of the polymer discs before and after hydration, respectively.

Test Method 3: Oxygen Permeability (Dk)

The oxygen permeability was measured by the method of Fatt et al., "Measurement of Oxygen Transmissibility and Permeability of Hydrogel Lenses and Materials", International Contact Lens Clinic, Vol. 9/No. 2, March/April 1982, p.76. A polarographic oxygen sensor consisting of a 4 mm diameter gold cathode and a silver-silver chloride ring anode are used in this method. The measured oxygen permeability is denoted by Dk, where D represents the diffusion coefficient for oxygen in the material being tested and k is the solubility of oxygen in the material. The permeability (Dk) units are $[(cm^2/s)(mL\ O_2/mL*mm\ Hg)]$.

EXAMPLE 1

Synthesis of Succinated Diglycidyl Bisphenol A Dimethacrylate.

A three neck, jacketed round bottom flask equipped with a Friedrichs condenser, a drying tube filled with indicating Drierite (anhydrous calcium sulfate), a 60 mL addition funnel and a magnetic stirring bar, was flamed dry and charged with 50 g of diglycidyl bisphenol A methacrylate (0.098 moles), 100 g of dry (% water<0.05) acetonitrile, and 20.6 g of succinic anhydride (0.206 moles). The succinic anhydride was added to the reaction flask via a powder funnel. A catalyst solution made up of 22.3 g of triethylamine (0.218 moles), 1.22 g of 4-dimethylamino pyridine (10 mmole) and 22 g of dry acetonitrile was charged to the 60 mL addition funnel, and subsequently added dropwise, with rapid stirring, to the reaction flask. The addition took 5 hrs to complete, and was carried out at room temperature. After the addition was finished, the reaction temperature was set at 50° C. and the reaction was allowed to proceed for 13 hrs.

The progress of the reaction was followed by infrared spectroscopy, monitoring the disappearance of the anhydride carbonyl peaks at 1770 $cm^{-1}$ and 1850 $cm^{-1}$. Since excess succinic anhydride was added initially, the intensity of the peaks was followed until no further change was noticeable.

Product workup was carried out by first combining the crude reaction mixture with an equal volume of ethyl acetate and then washing this mixture twice with equal volumes of an aqueous 5% HCl solution, and then twice with an equal volume of deionized water. The organic layers were then dried over anhydrous magnesium sulfate, and the combined aqueous layers were extracted twice with equal volumes of ethyl acetate. The ethyl acetate extracts were then dried over anhydrous magnesium sulfate. The original organic layers and the combined ethyl acetate extracts were then filtered and the solvent removed under reduced pressure in a rotary evaporator. The resulting light yellow clear viscous liquid was then used as is.

EXAMPLE 2

Synthesis of Perfluoroglutaric Anhydride Derivative of Diglycidyl Bisphenol A Dimethacrylate.

A three neck, jacketed round bottom flask equipped with a Friedrichs condenser, a drying tube filled with indicating Drierite, a 60 mL addition funnel and a magnetic stirring bar was flamed dry and charged with 27 g of diglycidyl bisphenol A dimethacrylate (0.0529 moles), 150 g of dry (% water<0.05) acetonitrile, and 23.5 g of perfluoroglutaric anhydride (0.106 moles). The reaction temperature was set at 5° C. A catalyst solution made up of 12.1 g of triethylamine (0.120 moles), 0.647 g of 4-dimethylamino pyridine (5.3 mmole) and 10 g of dry acetonitrile was charged to the 60 mL addition funnel, and subsequently added dropwise, with rapid stirring, to the reaction flask. The addition took 0.5 hr to complete. The addition funnel was then washed with an additional 50 mL of acetonitrile. After the addition was finished, the reaction temperature was set at 50° C. and the reaction was allowed to proceed for 16 hrs (overnight).

The progress of the reaction was followed by infrared spectroscopy, monitoring the disappearance of the anhydride carbonyl peaks at 1770 and 1850 $cm^{-1}$.

Product workup was by the same procedure employed in Example 1. The resulting clear viscous liquid was then used as is.

EXAMPLE 3

Synthesis of Polyethylene Glycol 4500 Dimethacrylate.

A total of 100 g of dry (% water<0.05) PEG 4500 (0.022 moles) was melted, and poured into a three neck, 1 L two-piece jacketed round bottom flask set up with a mechanical stirrer, a 125 mL addition funnel, and a drying tube filled with indicating Drierite. Dry isopropyl acetate (150 g) was added to the reaction flask while heating at 55° C. to dissolve the PEG. Once the PEG had completely dissolved in the isopropyl acetate, 12.75 g of methacrylic anhydride (0.0812 moles) was added dropwise, with stirring, to the reaction flask. After the addition of the anhydride was completed, a catalyst solution of triethylamine (7.86 g, 0.078 moles), 4-dimethylamino pyridine (270 mg, 2.22 mmoles) and isopropyl acetate (10 g) was charged to the addition funnel, and added dropwise over a 1.5–2.0 hr period to the PEG/methacrylic anhydride solution. After the catalyst solution addition was completed, the funnel was rinsed with 50 mL of isopropyl acetate. The reaction temperature was maintained at 5° C. to keep the PEG 4500 in solution.

The progress of the reaction was monitored by infrared spectroscopy, following the disappearance of the anhydride carbonyl absorption at 1785 $cm^{-1}$. In addition, aliquots of the crude reaction were analyzed chromatographically for extent of capping. The reaction was considered to be complete whenever the amount of dicapped product exceeded 97%. Typically, this degree of conversion is arrived at by simply allowing the reaction mix to stand overnight (14–16 hrs).

Product purification was carried out as follows. The solution containing the product was cooled to 10° C., and the solid PEG product was pressure filtered and rinsed with additional isopropyl acetate. Subsequently, the product was redissolved in acetonitrile (3:1 solvent ot PEG wt. ratio) and allowed to stir with Amberlite IRA 400-OH (3:1 wt. ratio relative to the PEG product) at room temperature for 3 hrs. At the end of this period, the Amberlite was gravity filtered and the resulting solution was reduced in volume in a rotary evaporator under reduced pressure until the PEG product began to precipitate out of solution. At this point, the minimum amount of acetonitrile required to redissolve the PEG product was added. The concentrated derivatized PEG product solution was then transferred to a large beaker (>1 L) and approximately 1–1.5 L of cold ethyl ether was added to induce precipitation of the PEG product. The product was pressure filtered and rinsed with additional ethyl ether. The white solid product was allowed to dry overnight under a nitrogen atmosphere.

EXAMPLE 4

Synthesis of IEM Capped Polyethylene Glycol 4500

A total of 100 g of dry (% water <0.05) PEG 4500 (0.022 moles) was melted, and poured into a three neck, 1 l two-piece jacketed round bottom flask set up with a mechanical stirrer, a 125 mL addition funnel, and a drying tube filled with indicating DRIERITE. Dry isopropyl acetate (150 g) was added to the reaction flask while heating at 55° C. to dissolve the PEG. Once the PEG had completely dissolved in the isopropyl acetate, 1000 ppm of 4-methoxyhydroquinone (MEHQ) was added to the reaction flask and allowed to dissolve. A catalytic amount of stannous octoate (100–150 mg) was added dropwise to the reaction flask. Dry air was then bubbled into the PEG 4500 solution via a small diameter straight tube for 20–30 minutes. A solution consisting of 6.85 g of 2-isocyanatoethyl methacrylate (IEM, 0.044 moles) and 50 g of isopropyl acetate was charged to the additional funnel and added dropwise, with stirring, to the reaction flask. The reaction temperature was maintained at 55° C. to keep the PEG 4500 in solution. After the addition of the IEM solution was completed, the reaction progress was monitored by infrared spectroscopy, following the disappearance of the isocyanate absorption at 2270 $cm^{-1}$.

After the reaction was completed, product purification was carried out as follows:

The solution containing the product was cooled to 25° C., at which temperature it crystallizes out of solution. The solid dicapped PEG product was then vacuum filtered, and washed with fresh, cold isopropyl acetate (100 g, T<20° C.). The product was then dried at 30° C. under reduced pressure (<3 mm Hg) for approximately 12 hours. The dried material was then powdered using a mortar and pestle. Yields for this reaction typically exceed 95% based on starting PEG 4500. The capping efficiency is then determined chromatographically (HPLC), and is usually found to be >97%.

EXAMPLES 5–10

In these examples, Glucam E-20, a 20-mole ethylene oxide methyl glucoside adduct obtained commercially from Amerchol, was used as a diluent in conjunction with monomer mixtures consisting of HEMA, the PEG 4500 dimethacrylate described in Example 1, and the succinated diglycidyl bisphenol A dimethacrylate described in Example 1. The following is an illustrative preparation:

A reactive monomer mixture consisting of 0.4% by weight Darocur 1173, 8.26 wt. % of the succinated diglycidyl bisphenol dimethacrylate crosslinking agent described in Example 1, 76.3 wt. % HEMA, and 15.0 wt. % of the PEG 4500 dimethacrylate crosslinker described in Example 3 was mixed with enough Glucam E-20 to make up a 48% reactive monomer/52% diluent mixture.

After thoroughly mixing this formulation at 65° C., it was transferred to contact lens molds. The filled molds were exposed to UV light (wavelength 300–380 nm, dose= 1.2–1.6 Joules/cm$^2$) for 20 minutes at approximately 65° C. The molds were then separated, and placed in physiological saline for 3 hours at 70 C. to remove the inert diluent and any unreacted monomers. After this initial hydration period, the lenses were allowed to equilibrate to room temperature in a fresh bath of physiological saline. The lenses were then tested according to test methods 1 and 3, and the EWC of each material was determined according to test method 2.

Table 1 displays the proportion of the various monomers and the results of the tests made in accordance with test methods 1–3 for the products formed in Examples 5–10.

EXAMPLES 11–16

In these examples, Glucam E-20 was used as a diluent in conjunction with monomer mixtures consisting of HEMA, the PEG 4500/IEM adduct described in Example 4, Darocur 1173, and the succinated diglycidyl bisphenol A dimethacrylate crosslinker described in Example 1. The following is an illustrative preparation:

A reactive monomer mixture consisting of 0.4 wt. % Darocur 1173, 8.26 wt. % of the succinated diglycidyl bisphenol A crosslinker described in Example 1, 76.3 wt. % HEMA, and 15.0 wt. % of the IEM dicapped PEG 4500 dimethacrylate crosslinker described in Example 4 was mixed with enough Glucam E-20 to make up a 48 wt. % reactive monomer/52 wt. % diluent mixture. After thoroughly mixing this formulation at 65° C., it was transferred to lens molds and treated by the same steps employed in Examples 5–10. Table 2 displays the proportion of the various monomers and the results of the tests made in accordance with test methods 1–3 for the products formed in Examples 11–16.

EXAMPLES 17–21

These examples, of lenses prepared using reactants other than the crosslinking agent of formula (1), are useful to show that lenses prepared in accordance with the present invention including a crosslinking agent of formula (1) exhibit consistently superior properties.

In these examples, a mixture consisting of 50 wt. % Glucam E-20 and 50 wt. % Photonol 7025, an 8-mole ethoxylated bisphenol A diol obtained from Henkel, was used as a diluent with monomer blends of HEMA, the PEG 4500/IEM adduct described in Example 4, Darocur 1173, and diglycidyl bisphenol A dimethacrylate (obtained from PolySciences). The following is an illustrative preparation:

A reactive monomer mixture consisting of 0.4 wt. % Darocur 1173, 5.1 wt. % of commercially obtained diglycidyl bisphenol A dimethacrylate, 79.5 wt. % HEMA, and 15.0 wt. % of the PEG 4500/IEM adduct described in Example 4 was mixed with enough 50:50 Glucam E-20/Photonol 7025 to make up a 50 wt. % reactive monomer/50 wt. % diluent mixture. After thoroughly mixing this formulation at 65° C. and transferring it to contact lens molds it was treated by the steps used in Examples 5–10. Table 3 displays the proportion of the various monomers and the results of the tests made in accordance with test methods 1–3 for the products formed in Examples 17–21.

EXAMPLES 22–26

In these examples, a 50:50 (wt.) mixture of Glucam E-20 and Photonol 7025 was used as a diluent with monomer blends of HEMA, 15.0 wt. % of the adduct described in Example 4, Darocur 1173, and the succinated diglycidyl bisphenol A dimethacrylate described in Example 1. The following is an illustrative preparation:

A reactive monomer mixture consisting of 0.4 wt. % Darocur 1173, 7.1 wt. % of the succinated diglycidyl bisphenol A dimethacrylate crosslinker described in Example 1, 77.5 wt. % HEMA, and 15.0 wt. % of the IEM dicapped PEG 4500 dimethacrylate crosslinker described in Example 4 was mixed with enough of the 50:50 Glucam E-20/Photonol 7025 diluent to make up a 50 wt. % reactive monomer/50 wt. % diluent mixture, which was thoroughly mixed at 65° C., transferred to contact lens molds, and treated using the steps employed in Examples 5–10. Table 4 displays the proportion of the various monomers and the results of the tests made in accordance with test methods 1–3 for the products formed in Examples 22–26.

EXAMPLES 27–31

In these examples, a 50:50 (wt.) mixture of Glucam E-20 and Photonol 7025 was used as a diluent with monomer blends of HEMA, the PEG 4500/IEM adduct described in Example 4, Darocur 1173, and the perfluoroglutaric anhydride/diglycidyl bisphenol A dimethacrylate derivative described in Example 2. The following is an illustrative preparation:

A reactive monomer mixture consisting of 0.4 wt. % Darocur 1173, 9.6 wt. % of the perfluoroglutaric anhydride/diglycidyl bisphenol A dimethacrylate derivative described in Example 2, 75 wt. % HEMA, and 15.0 wt. % of the IEM dicapped PEG 4500 dimethacrylate crosslinker described in Example 4 was mixed with enough of the 50:50 Glucam E20/Photonol 7025 diluent to make up a 50 wt. % reactive monomer/50 wt. % diluent mixture. After thoroughly mixing the mixture at 65° C., the mixture was transferred to contact lens molds and treated using the steps employed in Examples 5–10. Table 5 displays the proportion of the various monomers and the results of the tests made in accordance with test methods 1–3 for the products formed in Examples 27–31.

EXAMPLES 32–37

These are additional examples of lenses made not with a crosslinking agent of formula (1) used in the present invention, to demonstrate that the lenses of the present invention exhibit superior properties.

In these examples, a 50:50 (wt.) mixture of Glucam E-20 and Photonol 7025 was used as a diluent with monomer blends of HEMA, the PEG 4500/IEM adduct described in Example 4, Darocur 1173, and diglycidyl bisphenol A dimethacrylate (obtained from Polysciences). The following is an illustrative preparation:

A reactive monomer mixture consisting of 0.4 wt. % Darocur 1173, 5.1 wt. % of commercially obtained diglycidyl bisphenol A dimethacrylate, 84.5 wt. % HEMA, and 10.0 wt. % of the PEG 4500/IEM adduct described in Example 4 was mixed with enough 50:50 Glucal E-20/Photonol 7025 to make a 60 wt. % reactive monomer/40 wt. % diluent formulation. After thoroughly mixing this formulation at 65° C., it was transferred to contact lens molds and treated by the steps used in Examples 5–10. Table 6 displays the proportion of the various monomers and the results of the tests made in accordance with test methods 1–3 for the products formed in Examples 32–37.

EXAMPLES 38–43

In these examples, a 50:50 (wt.) mixture of Glucam E-20 and Photonol 7025 was used as a diluent with monomer blends of HEMA, the PEG 4500/IEM adduct described in Example 4, Darocur 1173, and the succinated diglycidyl bisphenol A dimethacrylate described in Example 1. The following is an illustrative preparation:

A reactive monomer mixture consisting of 0.4 wt. % Darocur 1173, 7.1 wt. % of the succinated diglycidyl bisphenol A crosslinker described in Example 1, 82.5 wt. % HEMA, and 10.0 wt. % of the IEM dicapped PEG 4500 dimethacrylate crosslinker described in Example 4 was mixed with enough of the 50:50 Glucam E-20/Photonol 7025 diluent to make up a 60 wt. % reactive monomer/40 wt. % diluent formulation. After thoroughly mixing this formulation at 65° C., it was transferred to contact lens molds and treated by the steps used in Examples 5–10. Table 7 displays the proportion of the various monomers and the results of the tests made in accordance with test methods 1–3 for the products formed in Examples 38–43.

EXAMPLES 44–49

In these examples, a 50:50 (wt.) mixture of Glucam E-20 and Photonol 7025 was used as a diluent with monomer blends of HEMA, the PEG 4500/IEM adduct described in Example 4, Darocur 1173, and the perfluoroglutaric anhydride/diglycidyl bisphenol A dimethacrylate derivative described in Example 2. The following is an illustrative preparation:

A reactive monomer mixture consisting of 0.4 wt. % Darocur 1173, 9.6 wt. % of the perfluoroglutaric anhydride/diglycidyl bisphenol A dimethacrylate derivative described in Example 2, 80.0 wt. % HEMA, and 10.0 wt. % of the IEM dicapped PEG 4500 dimethacrylate crosslinker described in Example 4 was mixed with enough of the 50:50 mixture of Glucam E-20 and Photonol 7025 to make up a 60 wt. % reactive monomer/40 wt. % diluent formulation. After thoroughly mixing this formulation at 65° C., it was transferred to contact lens molds and treated by the steps used in Examples 5–10. Table 8 displays the proportion of the various monomers and the results of the tests made in accordance with test methods 1–3 for the products formed in Examples 44–49.

EXAMPLES 50–54

These are additional examples of lenses made not using a crosslinking agent of formula (1), to help show that the lenses of the present invention exhibit superior properties.

In these examples, Photonol 7025 was used as a diluent with monomer blends of HEMA, Darocur 1173, methacrylic acid, and diglycidyl bisphenol A dimethacrylate (obtained from Polysciences). The following is an illustrative preparation:

A reactive monomer mixture consisting of 0.4 wt. % Darocur 1173, 3.7 wt. % of commercially obtained diglycidyl bisphenol A dimethacrylate, 93.9 wt. % HEMA, and 2.0 wt. % methacrylic acid was mixed with enough Photonol 7025 to make up a 48 wt. % reactive monomer/52 wt. % diluent formulation. After thoroughly mixing this formulation at 25° C., it was degassed at 40 mm Hg for 25 min in a rotary evaporator. The formulation was then transferred to contact lens molds and treated by the steps used in Examples 5–10 except that the exposure to UV light was carried out at a temperature of 55° C. Table 9 displays the proportion of the various monomers and the results of the tests made in accordance with test methods 1–3 for the products formed in Examples 50–54.

EXAMPLES 55–59

In these examples, Photonol 7025 was used as a diluent with monomer blends of HEMA, Darocur 1173, methacrylic acid, and the succinated diglycidyl bisphenol A dimethacrylate described in Example 1. The following is an illustrative preparation:

A reactive monomer mixture consisting of 0.4 wt. % Darocur 1173, 3.7 wt. % of the succinated bisphenol A dimethacrylate described in Example 1, 93.9 wt. % HEMA, and 2.0 wt. % methacrylic acid was mixed with enough Photonol 7025 to make up a 48 wt. % reactive monomer/52 wt. % diluent formulation. After thoroughly mixing this formulation at 25° C., it was transferred to contact lens molds and treated by the steps used in Examples 50–54. Table 10 displays the proportion of the various monomers and the results of the tests made in accordance with test methods 1–3 for the products formed in Examples 55–59. By comparing the data in Table 10 with the data in Tables 9 and 11, wherein all the lenses were of HEMA and methacrylic acid but only those of Table 10 employed the crosslinking agent of the present invention, it can be seen that the lenses of the present invention exhibit superior properties.

Examples 60–64

These are additional examples of lenses not made using a crosslinking agent according to the present invention, to help show that the lenses of the present invention exhibit superior properties. In these examples, Photonol was used as a diluent with monomer blends of HEMA, Darocur 1173, the IEM dicapped PEG 4500 dimethacrylate described in Example 4, and ethylene glycol dimethacrylate. The following is an illustrative preparation:

A reactive monomer mixture consisting of 0.4 wt. % Darocur 1173, 2.6 wt. % of ethylene glycol dimethacrylate, 87.0 wt. % HEMA and 10.0 wt. % of the IEM dicapped PEG 4500 dimethacrylate described in Example 4 was mixed with enough Photonol 7025 to make up a 48 wt. % reactive monomer/52 wt. % diluent formulation. After thoroughly mixing this formulation at 25° C., it was degassed at 40 mm Hg for 25 min in a rotary evaporator and was then transferred to contact lens molds and treated by the steps used in Examples 50–54. Table 11 displays the proportion of the various monomers and the results of the tests made in accordance with test methods 1–3 for the products formed in Examples 60–64.

EXAMPLE 65

Synthesis of 4,4'-(Hexafluoroisopropylidine)di-phthalic anhydride/HEMA Adduct.

To a flask equipped and prepared as in Example 1 were charged 40 g of 4,4'-(hexafluoropropylidine)-di-phthalic anhydride (0.09 moles), 320 g of dry (% water<0.05) tetrahydrofuran (THF) and 23.4 g of HEMA (0.18 moles). A catalyst solution of 18.2 g of triethylamine (0.18 moles), 1.1 g of 4-dimethylamino pyridine (9 mmoles) and 20 g of dry THF was charged to the 60 mL addition funnel, and subsequently added dropwise, with rapid stirring, to the reaction flask. The addition took 3 hrs to complete, and was carried out at room temperature. The reaction was then allowed to proceed for 12–16 hrs (overnight) at 25° C.

The progress of the reaction was followed by infrared spectroscopy, monitoring the disappearance of the anhydride carbonyl peaks at 1770 $cm^{-1}$ and 1850 $cm^{-1}$.

Product workup employed the procedure used in Example 1. A total of 34.9 g of a light yellow clear viscous liquid (55.1% yield) was obtained and used as is.

EXAMPLES 66–71

In these examples, a 50:50 (wt.) mixture of Glucam E-20 and Photonol 7025 was used as a diluent with monomer blends of HEMA, Darocur 1173, the IEM dicapped PEG 4500 dimethacrylate described in Example 4, and the fluoroanhydride/HEMA crosslinker described in Example 65. The following is an illustrative preparation:

A reactive monomer mixture consisting of 0.4 wt. % Darocur 1173, 2.8 wt. % of the fluorocrosslinker described in Example 65, 86.8 wt. % HEMA, and 10.0 wt. % of the IEM dicapped PEG 4500 dimethacrylate described in Example 4 was mixed with enough of the 50:50 Glucam E-20/Photonol 7025 mixture to make up a 60 wt. % reactive monomer/40 wt. % diluent formulation. After thoroughly mixing this formulation at 25° C., it was degassed at 40 mm Hg for 25 min in a rotary evaporator and was then transferred to contact lens molds and treated by the steps used in Examples 50–54. Table 12 displays the proportion of the various monomers and the results of the tests made in accordance with test methods 1–3 for the products formed in Examples 66–71.

The following Tables demonstrate that contact lenses formed using a crosslinking agent of formula (1), in accordance with the present invention, possess physical properties that are superior compared even to contact lenses made otherwise from the same materials and using the same diluents and proportions of diluents.

| ABREVIATIONS GUIDE | |
|---|---|
| Abreviation | Description |
| HEMA | Hydroxyethyl Methacrylate |
| MAA | Methacrylic Acid |
| EGDMA | Ethylene Glycol Dimethacrylate |
| MAnh | Methacrylic Anhydride |
| IEM | Isocyanatoethyl Methacrylate |
| DGBPA | Diglycidyl Bisphenol A Dimethacrylate |
| SuccBPA | Succinated Diglycidyl Bisphenol A Dimethacrylate |
| FGABPA | Fluoroglutaric Anhydride/DGBPA Adduct (ex 65) |
| IEM DC PEG 4500 | IEM Dicapped Polyethylene Glycol 4500 (ex 4) |
| DC PEG 4500 | MAnh Dicapped Polyethylene Glycol 4500 (ex 3) |

TABLE 1

| | Examples 5–10. | | | | | |
|---|---|---|---|---|---|---|
| | Example 5 | Example 6 | Example 7 | Example 8 | Example 9 | Example 10 |
| Composition (%): | | | | | | |
| HEMA | 86.3 | 81.3 | 76.3 | 66.3 | 56.3 | 48.3 |
| SuccBPA (ex 1) | 8.3 | 8.3 | 8.3 | 8.3 | 8.3 | 8.3 |
| PEG4500DC (ex 4) | 5.0 | 10.0 | 15.0 | 25.0 | 35.0 | 43.0 |
| DC 1173 | 0.4 | 0.4 | 0.4 | 0.4 | 0.4 | 0.4 |
| Diluent (%): | | | | | | |
| GLUCAM E-20 | 100 | 100 | 100 | 100 | 100 | 100 |
| Mon/Dil Ratio | 48:52 | 48:52 | 48:52 | 48:52 | 48:52 | 48:52 |
| Properties: | | | | | | |
| Modulus (psi) | 97 | 93 | 99 | 98 | 104 | 115 |
| % Elongation | 110 | 142 | 137 | 141 | 143 | 126 |
| Tensile Strength (ps | 62 | 81 | 85 | 93 | 99 | 92 |

TABLE 1-continued

Examples 5–10.

| | Example 5 | Example 6 | Example 7 | Example 8 | Example 9 | Example 10 |
|---|---|---|---|---|---|---|
| EWC (%) | 49.1 | 51.7 | 55.0 | 60.0 | 61.7 | 63.9 |
| Dk | 17 | 18 | 22 | 29 | 32 | 35 |

TABLE 2

Examples 11–16.

| | Example 11 | Example 12 | Example 13 | Example 14 | Example 15 | Example 16 |
|---|---|---|---|---|---|---|
| Composition (%): | | | | | | |
| HEMA | 86.3 | 81.3 | 76.3 | 66.3 | 56.3 | 48.3 |
| SuccBPA (ex 1) | 8.3 | 8.3 | 8.3 | 8.3 | 8.3 | 8.3 |
| PEG4500DC (ex 3) | 5.0 | 10.0 | 15.0 | 25.0 | 35.0 | 43.0 |
| DC 1173 | 0.4 | 0.4 | 0.4 | 0.4 | 0.4 | 0.4 |
| Diluent (%): | | | | | | |
| GLUCAM E-20 | 100 | 100 | 100 | 100 | 100 | 100 |
| Mon/Dil Ratio | 48:52 | 48:52 | 48:52 | 48:52 | 48:52 | 48:52 |
| Properties: | | | | | | |
| Modulus (psi) | 106 | 106 | 101 | 111 | 114 | 114 |
| % Elongation | 103 | 107 | 134 | 156 | 173 | 165 |
| Tensile Strength (ps | 65 | 70 | 86 | 115 | 118 | 112 |
| EWC (%) | 49.1 | 51.1 | 53.3 | 57.3 | 61.3 | 63.8 |
| Dk | 16 | 20 | 22 | 22 | 24 | 30 |

TABLE 3

Examples 17–21.

| | Example 17 | Example 18 | Example 19 | Example 20 | Example 21 |
|---|---|---|---|---|---|
| Composition (%): | | | | | |
| HEMA | 82.0 | 80.5 | 79.5 | 78.2 | 76.9 |
| DGBPA | 2.6 | 4.1 | 5.1 | 6.4 | 7.7 |
| PEG4500DC (ex 3) | 15.0 | 15.0 | 15.0 | 15.0 | 15.0 |
| DC 1173 | 0.4 | 0.4 | 0.4 | 0.4 | 0.4 |
| Diluent (%): | | | | | |
| GLUCAM E-20 | 50 | 50 | 50 | 50 | 50 |
| Photonol 7025 | 50 | 50 | 50 | 50 | 50 |
| Mon/Dil Ratio | 50:50 | 50:50 | 50:50 | 50:50 | 50:50 |
| Properties: | | | | | |
| Modulus (psi) | 71 | 91 | 108 | 125 | 137 |
| % Elongation | 123 | 126 | 177 | 122 | 138 |
| Tensile Strength (psi) | 55 | 72 | 109 | 97 | 120 |
| EWC (%) | 54.5 | 51.7 | 50.6 | 48.8 | 47.2 |
| Dk | 17 | 16 | 14 | 13 | 11 |

TABLE 4

Examples 22–26.

| | Example 22 | Example 23 | Example 24 | Example 25 | Example 26 |
|---|---|---|---|---|---|
| Composition (%): | | | | | |
| HEMA | 81.0 | 78.9 | 77.5 | 75.7 | 73.9 |
| SuccBPA (ex 1) | 3.6 | 5.7 | 7.1 | 8.9 | 10.7 |
| PEG4500DC (ex 4) | 15.0 | 15.0 | 15.0 | 15.0 | 15.0 |
| DC 1173 | 0.4 | 0.4 | 0.4 | 0.4 | 0.4 |
| Diluent (%): | | | | | |
| GLUCAM E-20 | 50 | 50 | 50 | 50 | 50 |
| Photonol 7025 | 50 | 50 | 50 | 50 | 50 |
| Mon/Dil Ratio | 50:50 | 50:50 | 50:50 | 50:50 | 50:50 |
| Properties: | | | | | |
| Modulus (psi) | 63 | 69 | 81 | 105 | 130 |
| % Elongation | 120 | 169 | 169 | 95 | 125 |
| Tensile Strength (psi) | 45 | 78 | 94 | 58 | 93 |
| EWC (%) | 57.5 | 56.9 | 56.8 | 56.1 | 56.1 |
| Dk | 20 | 21 | 21 | 19 | 19 |

TABLE 5

Examples 27–31.

| | Example 27 | Example 28 | Example 29 | Example 30 | Example 31 |
|---|---|---|---|---|---|
| Composition (%): | | | | | |
| HEMA | 79.8 | 76.9 | 75.0 | 72.6 | 70.3 |
| FGABPA (ex 2) | 4.8 | 7.7 | 9.6 | 12.0 | 14.3 |
| PEG4500DC (ex 4) | 15.0 | 15.0 | 15.0 | 15.0 | 15.0 |
| DC 1173 | 0.4 | 0.4 | 0.4 | 0.4 | 0.4 |
| Diluent (%): | | | | | |
| GLUCAM E-20 | 50 | 50 | 50 | 50 | 50 |
| Photonol 7025 | 50 | 50 | 50 | 50 | 50 |
| Mon/Dil Ratio | 50:50 | 50:50 | 50:50 | 50:50 | 50:50 |
| Properties: | | | | | |
| Modulus (psi) | 50 | 63 | 58 | 74 | 68 |
| % Elongation | 175 | 202 | 194 | 210 | 157 |
| Tensile Strength (psi) | 46 | 66 | 58 | 84 | 58 |
| EWC (%) | 57.8 | 56.8 | 56.6 | 56.4 | 56.1 |
| Dk | 19 | 20 | 20 | 15 | 20 |

TABLE 6

Examples 32–37.

| | Example 32 | Example 33 | Example 34 | Example 35 | Example 36 | Example 37 |
|---|---|---|---|---|---|---|
| Composition (%): | | | | | | |
| HEMA | 88.6 | 87.6 | 85.5 | 84.5 | 81.9 | 76.8 |
| DGBPA | 1.0 | 2.0 | 4.1 | 5.1 | 7.7 | 12.8 |
| PEG4500DC (ex 4) | 10.0 | 10.0 | 10.0 | 10.0 | 10.0 | 10.0 |
| DC 1173 | 0.4 | 0.4 | 0.4 | 0.4 | 0.4 | 0.4 |
| Diluent (%): | | | | | | |
| GLUCAM E-20 | 50 | 50 | 50 | 50 | 50 | 50 |
| Photonol 7025 | 50 | 50 | 50 | 50 | 50 | 50 |
| Mon/Dil Ratio | 60:40 | 60:40 | 60:40 | 60:40 | 60:40 | 60:40 |
| Properties: | | | | | | |
| Modulus (psi) | 38 | 56 | 82 | 93 | 138 | 311 |

TABLE 6-continued

Examples 32–37.

| | Example 32 | Example 33 | Example 34 | Example 35 | Example 36 | Example 37 |
|---|---|---|---|---|---|---|
| % Elongation | 173 | 174 | 160 | 148 | 155 | 147 |
| Tensile Strength (psi) | 40 | 50 | 74 | 76 | 117 | 152 |
| EWC (%) | 45.9 | 45.0 | 42.6 | 42.9 | 40.2 | 35.7 |
| Dk | 15 | 16 | 14 | 12 | 11 | 8.2 |

TABLE 7

Examples 38–43.

| | Example 38 | Example 39 | Example 40 | Example 41 | Example 42 | Example 43 |
|---|---|---|---|---|---|---|
| Composition (%): | | | | | | |
| HEMA | 88.2 | 86.8 | 83.9 | 82.5 | 78.9 | 71.8 |
| SuccBPA (ex 1) | 1.4 | 2.8 | 5.7 | 7.1 | 10.7 | 17.8 |
| PEG4500DC (ex 3) | 10.0 | 10.0 | 10.0 | 10.0 | 10.0 | 10.0 |
| DC 1173 | 0.4 | 0.4 | 0.4 | 0.4 | 0.4 | 0.4 |
| Diluent (%): | | | | | | |
| GLUCAM E-20 | 50 | 50 | 50 | 50 | 50 | 50 |
| Photonol 7025 | 50 | 50 | 50 | 50 | 50 | 50 |
| Mon/Dil Ratio | 40:60 | 40:60 | 40:60 | 40:60 | 40:60 | 40:60 |
| Properties: | | | | | | |
| Modulus (psi) | 41 | 49 | 68 | 76 | 106 | 175 |
| % Elongation | 232 | 215 | 165 | 108 | 112 | 83 |
| Tensile Strength (psi) | 46 | 53 | 62 | 47 | 69 | 87 |
| EWC (%) | 48.6 | 49.7 | 51.4 | 53.7 | 55.0 | 55.5 |
| Dk | 18 | 20 | 21 | 23 | 24 | 24 |

TABLE 8

Examples 44–49.

| | Example 44 | Example 45 | Example 46 | Example 47 | Example 48 | Example 49 |
|---|---|---|---|---|---|---|
| Composition (%): | | | | | | |
| HEMA | 87.7 | 85.8 | 82.0 | 80.1 | 75.3 | 65.7 |
| FGABPA (ex 2) | 1.9 | 3.8 | 7.6 | 9.5 | 14.3 | 23.9 |
| PEG4500DC (ex 4) | 10.0 | 10.0 | 10.0 | 10.0 | 10.0 | 10.0 |
| DC 1173 | 0.4 | 0.4 | 0.4 | 0.4 | 0.4 | 0.4 |
| Diluent (%): | | | | | | |
| GLUCAM E-20 | 50 | 50 | 50 | 50 | 50 | 50 |
| Photonol 7025 | 50 | 50 | 50 | 50 | 50 | 50 |
| Mon/Dil Ratio | 60:40 | 60:40 | 60:40 | 60:40 | 60:40 | 60:40 |
| Properties: | | | | | | |
| Modulus (psi) | 37 | 42 | 52 | 56 | 67 | 102 |
| % Elongation | 232 | 179 | 161 | 178 | 176 | 167 |
| Tensile Strength (psi) | 38 | 35 | 42 | 50 | 61 | 90 |
| EWC (%) | 46.5 | 45.3 | 41.1 | 44.9 | 43.9 | 41.8 |
| Dk | 17 | 16 | 15 | 14 | 15 | 13 |

TABLE 9

Examples 50–54.

| | Example 50 | Example 51 | Example 52 | Example 53 | Example 54 |
|---|---|---|---|---|---|
| Composition (%): | | | | | |
| HEMA | 95.6 | 94.5 | 93.5 | 92.5 | 89.9 |
| DGBPA | 2.0 | 3.1 | 4.1 | 5.1 | 7.7 |
| MAA | 2.0 | 2.0 | 2.0 | 2.0 | 2.0 |
| DC 1173 | 0.4 | 0.4 | 0.4 | 0.4 | 0.4 |
| Diluent (%): | | | | | |
| Photonol 7025 | 100 | 100 | 100 | 100 | 100 |
| Mon/Dil Ratio | 48:52 | 48:52 | 48:52 | 48:52 | 48:52 |
| Properties: | | | | | |
| Modulus (psi) | 42 | 49 | 61 | 69 | 89 |
| % Elongation | 115 | 98 | 78 | 80 | 69 |
| Tensile Strength (psi) | 36 | 39 | 42 | 50 | 63 |
| EWC (%) | 47 | 45 | 42 | 43 | 39 |

TABLE 10

Examples 55–59.

| | Example 55 | Example 56 | Example 57 | Example 58 | Example 59 |
|---|---|---|---|---|---|
| Composition (%): | | | | | |
| HEMA | 94.8 | 93.3 | 91.9 | 90.5 | 86.9 |
| SuccBPA (ex 1) | 2.8 | 4.3 | 5.7 | 7.1 | 10.7 |
| MAA | 2.0 | 2.0 | 2.0 | 2.0 | 2.0 |
| DC 1173 | 0.4 | 0.4 | 0.4 | 0.4 | 0.4 |
| Diluent (%): | | | | | |
| Photonol 7025 | 100 | 100 | 100 | 100 | 100 |
| Mon/Dil Ratio | 48:52 | 48:52 | 48:52 | 48:52 | 48:52 |
| Properties: | | | | | |
| Modulus (psi) | 39 | 45 | 57 | 64 | 80 |
| % Elongation | 161 | 96 | 77 | 60 | 46 |
| Tensile Strength (psi) | 46 | 37 | 39 | 40 | 41 |
| EWC (%) | 51 | 50 | 52 | 53 | 53 |

TABLE 11

Examples 60–64.

| | Example 60 | Example 61 | Example 62 | Example 63 | Example 64 |
|---|---|---|---|---|---|
| Composition (%): | | | | | |
| HEMA | 88.9 | 88.3 | 87.0 | 86.3 | 84.6 |
| PEG 4500DMA (ex 4) | 10.0 | 10.0 | 10.0 | 10.0 | 10.0 |
| EGDMA | 0.7 | 1.3 | 2.6 | 3.3 | 5.0 |
| DC 1173 | 0.4 | 0.4 | 0.4 | 0.4 | 0.4 |
| Diluent (%): | | | | | |
| Photonol 7025 | 100 | 100 | 100 | 100 | 100 |
| Mon/Dil Ratio | 48:52 | 48:52 | 48:52 | 48:52 | 48:52 |
| Properties: | | | | | |
| Modulus (psi) | 85 | 102 | 152 | 173 | 280 |
| % Elongation | 184 | 125 | 105 | 112 | 94 |
| EWC (%) | 48.9 | 47.6 | 45.9 | 45.1 | 43.3 |

TABLE 12

| | Examples 66–71. | | | | | |
|---|---|---|---|---|---|---|
| | Example 66 | Example 67 | Example 68 | Example 69 | Example 70 | Example 71 |
| Composition (%): | | | | | | |
| HEMA | 88.2 | 86.8 | 83.9 | 82.6 | 79.0 | 72.2 |
| PEG 4500DMA (ex 4) | 10.0 | 10.0 | 10.0 | 10.0 | 10.0 | 10.0 |
| HFBPA (ex 65) | 1.4 | 2.8 | 5.7 | 7.0 | 10.6 | 17.4 |
| DC 1173 | 0.4 | 0.4 | 0.4 | 0.4 | 0.4 | 0.4 |
| Diluent (%): | | | | | | |
| GLUCAM E-20 | 50 | 50 | 50 | 50 | 50 | 50 |
| Photonol 7025 | 50 | 50 | 50 | 50 | 50 | 50 |
| Mon/Dil Ratio | 60:40 | 60:40 | 60:40 | 60:40 | 60:40 | 60:40 |
| Properties: | | | | | | |
| Modulus (psi) | 54 | 64 | 71 | 88 | 100 | 134 |
| % Elongation | 196 | 157 | 129 | 102 | 113 | 77 |
| EWC (%) | 51.8 | 52.5 | 55.3 | 55.9 | 58.4 | 61.8 |
| Dk | 15.0 | 15.4 | 18.7 | 20.4 | 22.4 | 29.4 |

HFBPADMA = Hexafluoro bisphenol A dimethacrylate (example 65).

What is claimed is:

1. A hydrophilic contact lens formed by copolymerizing a polymerizable mixture comprising at least one hydrophilic monomer and further comprising at least one crosslinking agent of formula (1):

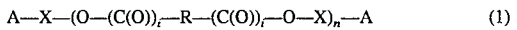

A—X—(O—(C(O))$_i$—R—(C(O))$_i$—O—X)$_n$—A        (1)

wherein n is 1 to 6; i is independently in each occurrence 0 or 1;

R is a divalent bridge containing at least one saturated or unsaturated cyclic or bicyclic moiety;

X is a linear divalent alkyl bridge containing 2 to 12 carbon atoms optionally substituted with at least one side chain containing a —OC(O)— linkage and a total of up to 12 carbon atoms, which side chain is optionally substituted with fluorine and optionally contains a phenyl ring that can optionally be substituted with alkyl containing 1 to 6 carbon atoms; and A is acrylate, methacrylate, vinylbenzoyloxy, or vinylphenoxy, from the terminal oxygen of which is optionally pendant a polyalkoxy group containing 1 to 10 ethoxy or propoxy units;

provided that said crosslinking agent is substituted with at least one —COOH group on R or X.

2. A contact lens according to claim 1 wherein said polymerizable mixture comprises HEMA.

3. A contact lens according to claim 2 wherein n is 1 or 2.

4. A contact lens according to claim 3 wherein R has the formula —Ph—Z—Ph wherein each —Ph— denotes a phenyl ring which is optionally substituted with one or two alkyl groups containing 1 to 6 carbon atoms, and Z denotes a chemical bond, —O—, —SO$_2$—, or —C(Y)$_2$— wherein Y is hydrogen or alkyl containing 1 to 6 carbon atoms which is optionally substituted with fluorine.

5. A contact lens according to claim 4 wherein A is acrylate or methacrylate.

6. A contact lens according to claim 5 wherein said crosslinking agent of formula (1) is substituted on R, X or both with at least two —COOH groups.

7. A contact lens according to claim 6 where each X is substituted with a —COOH group.

8. A contact lens according to claim 7 wherein each X is a linear alkyl group containing 2 or 3 carbon atoms which is substituted with a side chain that contains up to 12 carbon atoms, contains a —OC(O)— linkage, optionally contains a phenyl ring and is optionally substituted with fluorine.

9. A contact lens according to claim 8 wherein each X is a linear group containing 2 or 3 carbon atoms which is substituted with —OC(O)—L—COOH wherein L is —CH$_2$CH$_2$—, —CH(CH$_3$)CH$_2$—, —CH=CH—, —CF$_2$CF$_2$—, —CF$_2$CF$_2$CF$_2$—, —CH$_2$CH$_2$CH$_2$—, —CH(=CH$_2$)CH$_2$, or —C$_6$H$_4$—.

10. A contact lens according to claim 1 wherein n is 1 or 2.

11. A contact lens according to claim 1 wherein R has the formula —Ph—Z—Ph— wherein each —Ph— denotes a phenyl ring which is optionally substituted with one or two alkyl groups containing 1 to 6 carbon atoms, and Z denotes a chemical bond, —O—, —SO$_2$—, or —C(Y)$_2$— wherein Y is hydrogen or alkyl containing 1 to 6 carbon atoms which is optionally substituted with fluorine.

12. A contact lens according to claim 1 wherein A is acrylate or methacrylate.

13. A contact lens according to claim 1 wherein said crosslinking agent of formula (1) is substituted on R, X or both with at least two —COOH groups.

14. A contact lens according to claim 1 where each X is substituted with a —COOH group.

15. A contact lens according to claim 1 wherein each X is a linear alkyl group containing 2 or 3 carbon atoms which is substituted with a side chain that contains up to 12 carbon atoms, contains a —OC(O)— linkage, optionally contains a phenyl ring and is optionally substituted with fluorine.

16. A contact lens according to claim 1 wherein each X is a linear group containing 2 or 3 carbon atoms which is substituted with —OC(O)—L—COOH wherein L is —CH$_2$CH$_2$—, —CH(CH$_3$)CH$_2$—, —CH=CH—, —CF$_2$CF$_2$—, —CF$_2$CF$_2$CF$_2$—, —CH$_2$CH$_2$CH$_2$—, —CH(=CH$_2$)CH$_2$, or —C$_6$H$_4$.

17. A contact lens according to claim 3 wherein R is phenyl or a fused two-ring homocyclic moiety and is optionally substituted with alkyl that contains 1 to 6 carbon atoms and is optionally substituted with fluorine.

18. A contact lens according to claim 16 wherein A is acrylate or methacrylate.

19. A contact lens according to claim 17 wherein said crosslinking agent of formula (1) is substituted on R, X or both with at least two —COOH groups.

20. A contact lens according to claim 18 wherein R is substituted with at least two —COOH groups.

21. A contact lens according to claim 19 wherein each X is a linear alkyl group containing 2 or 3 carbon atoms.

22. A contact lens according to claim 1 wherein R is phenyl or a fused two-ring homocyclic moiety and is optionally substituted with alkyl that contains 1 to 6 carbon atoms and is optionally substituted with fluorine.

23. A contact lens according to claim 1 wherein R is substituted with at least two —COOH groups.

24. A contact lens according to claim 1 wherein each X is a linear alkyl group containing 2 or 3 carbon atoms.

* * * * *